United States Patent [19]

Allan

[11] Patent Number: 4,534,421

[45] Date of Patent: Aug. 13, 1985

[54] TOOL ASSEMBLY

[76] Inventor: David T. Allan, 9 Broomhill Dr., Glasgow, Scotland

[21] Appl. No.: 405,937

[22] Filed: Aug. 5, 1982

[30] Foreign Application Priority Data

| Aug. 28, 1981 | [GB] | United Kingdom | 8126367 |
| Dec. 1, 1981 | [GB] | United Kingdom | 8136259 |
| Dec. 10, 1981 | [GB] | United Kingdom | 8137242 |

[51] Int. Cl.³ .............................................. E21C 35/02
[52] U.S. Cl. ..................................... 173/130; 83/698; 175/417; 279/79; 299/69; 299/94; 403/381; 403/331
[58] Field of Search ................. 173/53, 128, 133, 130; 299/37, 69, 94; 279/79, 75, 76, 1 R; 82/36 B, 36 A, 36 R; 407/198, 101, 108, 109, 112; 83/571, 698, 700; 30/241, 392, 169; 175/417; 403/381, 331, 379, 373

[56] References Cited

U.S. PATENT DOCUMENTS

| 1,422,264 | 7/1922 | Hawkesworth | 175/417 |
| 2,131,056 | 9/1938 | Lind | 175/417 |
| 3,121,289 | 2/1964 | Eyolfson | 279/97 |
| 3,366,420 | 1/1968 | Young | 299/37 |
| 3,719,117 | 3/1973 | Mauk et al. | 83/698 |
| 3,904,245 | 9/1975 | Clarke | 299/37 |
| 4,174,113 | 11/1979 | Eckman | 279/75 |
| 4,225,187 | 9/1980 | Allan | 299/37 |
| 4,257,648 | 3/1981 | Bodine | 299/37 |
| 4,270,422 | 6/1981 | Andersson | 407/101 |
| 4,320,924 | 3/1982 | Langfield et al. | 299/37 |

FOREIGN PATENT DOCUMENTS

599770 1/1926 France .................. 403/379

Primary Examiner—Frank T. Yost
Assistant Examiner—Hien H. Phan
Attorney, Agent, or Firm—Mason, Fenwick & Lawrence

[57] ABSTRACT

A tool assembly in which the tool holder 6 forms a relatively small volume of metal thereby facilitating brazing of the tool bits (21, 23) and inexpensive replacement.

13 Claims, 15 Drawing Figures

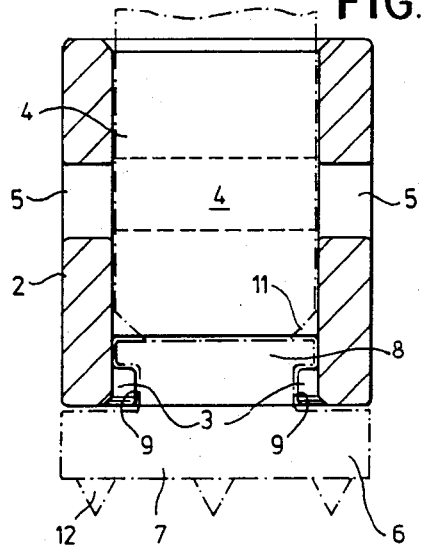
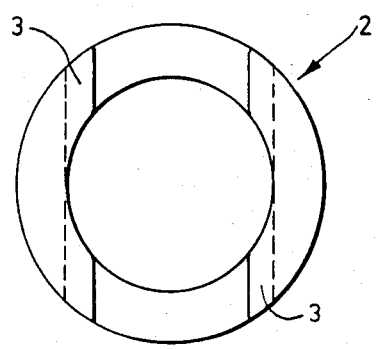
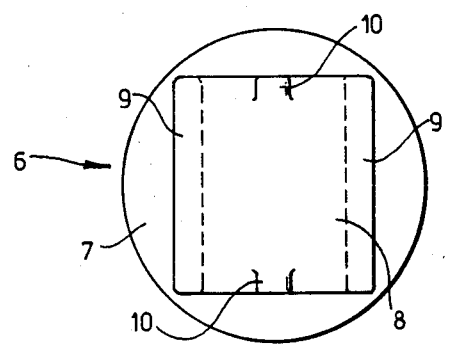
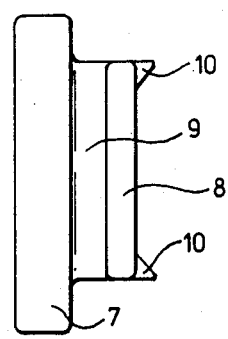

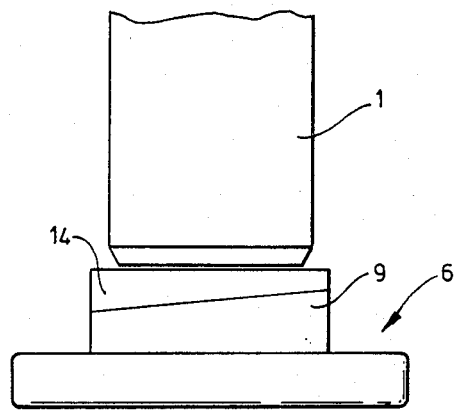
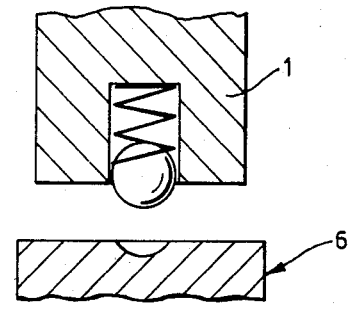
FIG.5.
FIG.6.
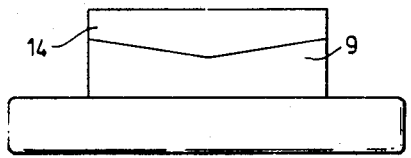
FIG.7.
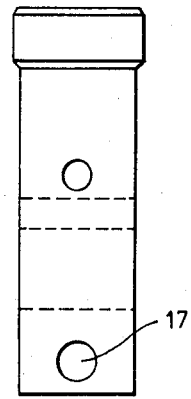
FIG.8.
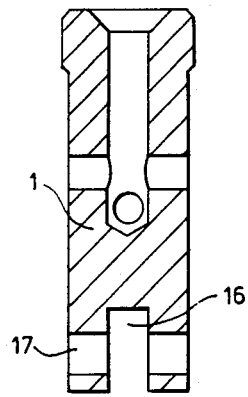
FIG.9.
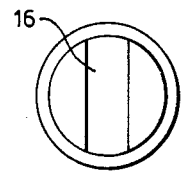
FIG.10.

TOOL ASSEMBLY

BACKGROUND OF THE INVENTION

1. Field of the Invention

This invention relates to a tool assembly, especially but not exclusively for use on pneumatic tools such as scabblers, scalers and the like.

2. Description of the Prior Art

Previously known scabblers and scalers comprise one or more pistons reciprocable in a body under fluid power which pistons include, at a free end, tool assemblies comprising a female monolithic tool holder into which are set the tool bits adapted to strike a workpiece. The tool bits are commonly formed as tungsten carbide inserts brazed into the tool holder. The tool holder generally has an upper recess into which the piston extends, and the holder and piston are held together by a spring pin which is forced through corresponding but slightly offset bores pressing through the holder and piston. The spring pin deforms and thus holds the holder and piston tightly against each other.

A disadvantage of this previously used arrangement is that the entire tool holder has to be heated when the tool bits are being brazed which has the effect of reducing the effectiveness and/or lifetime of the holder. Furthermore, only the part of the tool-holder adjacent the tips is subject to excessive wear so that replacement of the entire holder is wasteful.

SUMMARY OF THE INVENTION

According to the present invention there is provided a tool assembly comprising a piston, a sleeve around the piston, the piston and sleeve being correspondingly apertured to receive a locking pin, and a tool holder abutting an end face of the piston and an opposing face of the sleeve so as to be a tight fit between said faces.

Preferably the tool holder engages with the sleeve through a projection-and-recess arrangement. For example a projection or flange on one of the holder and sleeve may fit within a recess in the other.

The tool holder may have a tapered portion which, when the holder is driven into position, wedges the holder tightly between the sleeve and the piston.

A detent may be provided to locate the tool holder in position on the end face of the piston. The tool holder and piston end face may be of complementary profile so as to locate positively against each other, ensuring correct seating of the tool holder.

Further according to the present invention there is provided a tool assembly comprising a piston, a slot in the end face of the piston, a tool holder abutting said end face of the piston and having an upstanding flange adapted to be a close fit in the slot, the piston and the flange being correspondingly apertured to receive a locking pin.

The apertures may be through bores and are preferably offset so that the locking pin forces the piston and tool holder tightly together. The pin may be a spring pin and thereby provides resilience for ensuring that the piston and tool holder do not move relative to one another in use.

BRIEF DESCRIPTION OF THE DRAWINGS

Embodiments of the invention will now be described by way of example with reference to the accompanying drawings, in which:

FIG. 1 is a section through a tool assembly of this invention;

FIG. 2 is an end view of the sleeve in FIG. 1;

FIG. 3 is an end view of the tool holder in FIG. 1;

FIG. 4 is a side view of the holder of FIG. 3;

FIGS. 5, 6 and 7 are each a diagrammatic view of modified tool assemblies;

FIGS. 8, 9 and 10 are side, section and plan views respectively of a further modified piston of a tool assembly;

DESCRIPTION OF THE PREFERRED EMBODIMENTS

Figure 11:
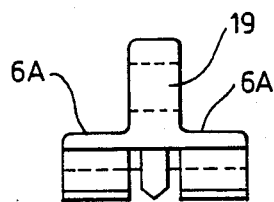
FIGS. 11, 12 and 13 are side iews and a plan view respectively of a modified tool holder for use with the piston of FIGS. 8 to 10.
Figure 12:
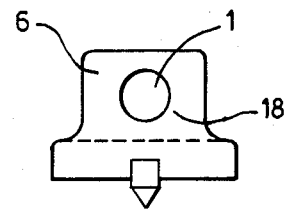
Figure 13:
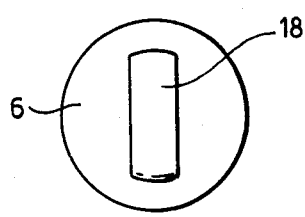

Referring now to FIGS. 1 to 4 of the drawings, the tool assembly of this embodiment of the invention is for a scabbling machine and has a piston 1 which is mounted for reciprocal motion within a cylinder (not shown). A cylindrical sleeve 2 fits around the lower end portion of the piston 1, the sleeve 2 being annular where it surrounds the piston 1, while below this area it has a straight-through passageway having a pair of inwardly-facing opposed flanges 3 at its lower end.

The piston 1 has a through bore 4 and the sleeve 2 has apertures 5 in its wall such that when fully assembled the bore 4 is slightly offset vertically relative to the apertures 5.

A tool holder 6 has a circular base 7 into which tungsten carbide tool bits 12 are brazed and a rectangular upper portion 8 which has recesses 9 along each side of a depth corresponding to the flanges 3 of the sleeve 2. The holder 6 slides into engagement with the sleeve 2 by interfitting the flanges 3 and recesses 9 as shown in FIG. 1, and in the embodiment shown in FIGS. 1 to 4 is located in position by means of projections 10 at opposite edges of its upper face engaging in a chamfer 11 around the piston end face. Alternatively co-operating pins and holes may be provided. The upper face of the holder abuts the end face of the piston and the scabbler tool bits 12 are embedded in the underside of the holder 6.

To fit the assembly of FIGS. 1 to 4 together, the tool holder 6 is slid into position on sleeve along flanges 3 so that their axes approximately coincide. Then this subassembly (2+6) is located on the end of the piston 1, so that the projections 10 engage the chamfer 11. A spring pin 20 is then driven through the apertures 5 and the bore 4 to force the sleeve 2 upwards relative to the piston 1 due to the offset of the apertures 5 and bore 4. This upward movement pulls the flanges 3 tightly against the upper face of the recesses 9 and consequently the tool holder against the end face of the piston thereby fixing it securely in position. After a period of use the tool holder can be replaced by knocking out the spring pin 20 and sliding the holder from the sleeve.

In modified embodiments the tool holder 7 may be removed from the assembly without removing the spring pin. One such modified embodiment is shown in FIG. 5. In this embodiment the flanges 14 on the upper portion of the tool holder are formed with a slightly inclined face as shown and a corresponding incline is formed on the flanges 3 on the sleeve so as to facilitate a taper-lock. In fitting this assembly together, the spring pin is inserted through the sleeve and piston before locating the tool holder 6. The holder 6 is then driven into position by engagement of the flanges 3 in the recesses 9 until a tight fit is obtained through the taper-lock acting against the deflection of the spring pin.

An advantage of the embodiment of FIG. 5 is that the tapered flanges 14 make it less important to machine to a critical size, and the tool holder can be readily knocked out for replacement.

In a further embodiment as shown in FIG. 6 the bottom face of the tool holder 6 is provided with detent means comprising for example a spring loaded ball 15 co-operating with a recess 16 to provide positive locking. Alternatively, the profile of the mating faces may be of complementary concave and convex shape respectively.

In the embodiment shown in FIG. 7 positive locking is achieved by providing the flanges 14 and 3 with complementary angled faces as shown so that the tool holder can be driven home against the resilience of the pin until the holder passes over the centre. This arrangement has the advantage of being self-aligning.

The embodiment of the invention described above each provide a relatively small tool holder 6 which can be readily fitted and removed. Removal can be either by driving out the spring pin or by driving out the holder 6 itself. The tool holder can therefore be made cheaply and can be replaced when worn considerably easier and less expensively than in prior art arrangements.

In the embodiments shown in FIGS. 8 to 15 a scaler tool assembly is shown in which the sleeve has been dispensed with and the piston 1 is provided with a slot 16 and aligned holes 17 passing therethrough. The slot 16 is adapted to accommodate an upstanding flange 18 on the tool holder 6 which has a hole 19 therethrough which is misaligned by a few thousandths of an inch relative to the holes 17 so that when assembled a spring pin can be driven through the holes forcing the faces 6A of the tool holder 6 hard against the bottom face of the piston 1.

Figure 14:
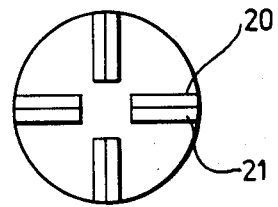
FIGS. 14 and 15 are views from below of a further modified tool holder.
Figure 15:
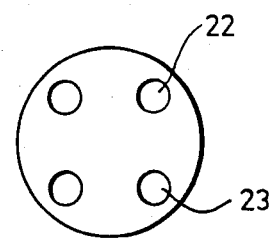

Referring to FIGS. 14 and 15 the tool holder 6 may be cast or moulded with four slots 20 into which chisel-like tool bits 21 are brazed, alternatively five holes 22 may be provided into which circular bits 23 may be brazed. Moreover, the tool holder may be formed with both the slots 20 and the holes 22 so that a single component can be selectively used for the different type of bits.

In each of the above described embodiments the tool holder forms a relatively small part of the assembly thereby substantially reducing replacement costs when the holder becomes worn. Furthermore, when the tool bits are being brazed into the holder a much smaller volume of metal need be heated.

Modifications and improvements may be incorporated without departing from the scope of the invention.

I claim:
1. A tool assembly comprising:
   a piston;
   a diametric aperture through said piston;
   a sleeve around the piston;
   a pair of diametrically opposed apertures in said sleeve corresponding to the aperture in said piston;
   a locking pin through said apertures;
   a pair of inwardly directed flanges on a lower part of said sleeve; and
   a tool holder having a lower portion carrying a plurality of tool bits and a substantially rectangular upper portion formed with a pair of outwardly directed flanges, the arrangement being such that when said locking pin is in said apertures the upper surface of the tool holder abuts an end face of the piston and said flanges on the upper portion of the tool holder are a tight fit between said end face of the piston and opposing faces on the flanges of the sleeve.

2. A tool assembly as claimed in claim 1, in which the tool holder engages with the sleeve through a projection-and-recess arrangement.

3. A tool assembly as claimed in claim 2, in which a projection or flange on one of the holder and sleeve fits within a recess in the other.

4. A tool assembly as claimed in claim 3 in which said apertures are through bores and are offset so that the locking pin forces the piston and tool holder tightly together.

5. A tool assembly as claimed in claim 2 in which said apertures are through bores and are offset so that the locking pin forces the piston and tool holder tightly together.

6. A tool assembly as claimed in claim 1, in which the tool holder has a tapered portion which, when the holder is driven into position, wedges the holder tightly between the sleeve and the piston.

7. A tool assembly as claimed in claim 6 in which said apertures are through bores and are offset so that the locking pin forces the piston and tool holder tightly together.

8. A tool assembly as claimed in claim 1, in which a detent is provided to locate the tool holder in position on the end face of the piston.

9. A tool assembly as claimed in claim 8 in which said apertures are through bores and are offset so that the locking pin forces the piston and tool holder tightly together.

10. A tool assembly as claimed in claim 1, in which the tool holder and piston end face are of complementary profile so as to locate positively against each other to ensure correct seating of the tool holder.

11. A tool assembly as claimed in claim 10 in which said apertures are through bores and are offset so that the locking pin forces the piston and tool holder tightly together.

12. A tool assembly as claimed in claim 1 in which said apertures are through bores and are offset so that the locking pin forces the piston and tool holder tightly together.

13. A tool assembly as claimed in claim 12, in which the locking pin is a spring pin and thereby provides resilience for ensuring that the piston and the tool holder do not move relative to one another in use.

* * * * *